United States Patent
Abel et al.

(10) Patent No.: US 8,151,067 B2
(45) Date of Patent: *Apr. 3, 2012

(54) MEMORY SHARING MECHANISM BASED ON PRIORITY ELEVATION

(75) Inventors: Francois G. Abel, Rueschlikon (CH); Wolfgang Denzel, Langnau am Albis (CH); Antonius Engbersen, Feusisberg (CH); Ferdinand Gramsamer, Wettswil (CH); Mitch Gusat, Adliswil (CH); Ronald P. Luijten, Horgen (CH); Cyriel Minkenberg, Adliswil (CH); Mark Verhappen, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/051,177

(22) Filed: Mar. 19, 2008

(65) Prior Publication Data

US 2008/0165793 A1    Jul. 10, 2008

Related U.S. Application Data

(63) Continuation of application No. 10/611,024, filed on Jul. 1, 2003, now Pat. No. 7,392,355.

(51) Int. Cl.
*G06F 12/00* (2006.01)

(52) U.S. Cl. .................................. 711/158; 370/229
(58) Field of Classification Search .................. 711/158; 370/229
See application file for complete search history.

(56) References Cited

U.S. PATENT DOCUMENTS

| | | | |
|---|---|---|---|
| 5,913,215 A | 6/1999 | Rubinstein et al. | |
| 6,188,670 B1* | 2/2001 | Lackman et al. | 370/231 |
| 6,438,135 B1 | 8/2002 | Tzeng et al. | |
| 6,628,610 B1 | 9/2003 | Waclawsky et al. | |
| 6,643,256 B1* | 11/2003 | Shimojo et al. | 370/229 |
| 6,657,962 B1 | 12/2003 | Barri et al. | |
| 6,851,035 B1 | 2/2005 | Zhou et al. | |
| 6,934,250 B1 | 8/2005 | Kejriwal et al. | |
| 7,340,529 B1* | 3/2008 | Yazaki et al. | 709/232 |
| 2003/0107991 A1 | 6/2003 | Tezuka et al. | |
| 2003/1012079 | 6/2003 | Reinshmidt | |

* cited by examiner

*Primary Examiner* — Matthew Bradley
(74) *Attorney, Agent, or Firm* — Derek S. Jennings; Anne Vachon Dougherty

(57) ABSTRACT

The present invention discloses a memory sharing mechanism based on priority elevation. In accordance with the present invention, there is provided an apparatus and method for transporting packets of data in a communication device, wherein each packet is assigned one of several priorities and received based on memory state information. The method comprises the steps of storing the received packets in a memory and modifying the assigned priority of any of the packets causing congestion within the memory.

16 Claims, 3 Drawing Sheets

MEMORY SHARING MECHANISM BASED ON PRIORITY ELEVATION

CROSS REFERENCE TO RELATED APPLICATION

The present application is a continuation of U.S. patent application Ser. No. 10/611,024 filed Jul. 1, 2003, now U.S. Pat. No. 7,392,355.

TECHNICAL FIELD

The present invention relates to a communication system for transporting packets of data, particularly where the packets are transported with an assigned priority. More particularly the invention relates to a communication device, e.g. a switch, that receives packets based on memory state information. Further, the invention relates to a method for transporting packets of data in the communication device. The invention is also related to an input adapter for transporting packets of data to the communication device.

DESCRIPTION OF PRIOR ART

The popularity of the World Wide Web and its annual increase in size requires increasingly larger and faster switching fabrics, also referred to as switching devices or switches. To meet today's switching requirement of 1 Tb/s throughput and above, switches are growing not only in terms of port speed, but also in number of ports. With 5 Gb/s links, port sizes of 64, and today's link and fabrication technologies, multi-chip and even multi-shelf solutions are necessary. As a consequence, input adapters with virtual output queuing (VOQ) are at a distance from the switching device such that the round trip time (RTT) bandwidth product is significantly greater than 1. On the other hand switch packet sizes in terms of bytes remain constant. This means that there are more packets on the link, which requires larger memories in the switching device to accept all packets in transit. This is a necessity in order that the switch be work-conserving and loss-less, depending on the link-level flow-control scheme used.

Packet buffers as memory are typically arranged per output within such a switching device, referred to as output buffers, or per input/output pair, referred to as cross point buffers. However, switch-internal buffers are expensive since they demand memory with a multiple of the port bandwidth. In order to minimize the switch memory requirement, additional packet buffers are used in front of each input port of the switch, referred to as input buffers. These buffers are less expensive since they use memory with the bandwidth of a single port only. Typically, the input buffers are organized as virtual output queues (VOQ), i.e., one logically separate queue is provided for each switch output at each switch input port. Usually, a flow control scheme between the switch buffers and the input queues is applied that ensures that packets wait in the input queues when the switch buffer, i.e. the memory, is full.

If a switching system comprising the switch and the input adapters is physically very large, long cables are needed to connect the input queues at the input adapters to the switch buffers. At very high speeds, the delay of these long cables may become a multiple of a packet time duration and causes each packet to arrive at the switch buffer several packet times after it has been sent from the input queue. Similarly, any flow-control signals that are returned by the switch to the port adapters also arrive there delayed by the same amount of time. The sum of these two delays is referred to as round trip time, hereafter abbreviated to RTT, which is expressed in a number of packets in the following description.

Dependent on the flow-control scheme, the minimum used switch buffer size in order to avoid both buffer overflow and buffer underflow is dependent on RTT. In particular, if the flow control is grant-based the buffer size should not be smaller than 2*RTT per input and per output, and if the flow control is credit-based, this buffer size should not be smaller than RTT.

If the switch has to provide traffic support for multiple preemptive priorities or priority classes, it should be ensured that each priority has its own minimum buffer space of RTT in order to support 100% traffic bursts from any input to any output port without any chance for blocking of higher priority packets (spatial priority blocking) due to switch buffer space being consumed by lower priority packets. Given P priorities or priority classes, whereby P is the number of priorities, the minimum used switch buffer size is hence RTT·P.

Assuming, for example, an n×n switch with n=64 ports, P=8 priorities and cable lengths of >30 m at port speeds of 40 Gb/s, the total switch memory size of $n^2 \cdot P \cdot RTT$ would be so large that current CMOS technology does not allow an economic implementation.

In general, a resource M, that is a reception buffer (RX buffer) or memory, is strictly sufficient for any single priority, under strict or fixed service discipline. Alternatively, the resource M is sufficient for a subset of priorities, whereby each single priority is allocated a given quota or percentage of the resource M. The quota, or sufficiency rule, could be based on work-conservation (RTT-dependant), or any other constraint imposed by a specific application. For example, in CIOQ (combined input and output queuing) switches with internal support for large RTTs and preemptive QoS (quality of service) service, the highest priority currently available should acquire within a bounded time interval the full resource M, with M=RTT of the reception buffer (quota=100%). In most general cases, an essential requirement is that any priority should acquire its allocated quota of the resource M within a tightly bounded time interval.

A classical solution against spatial priority blocking is to dedicate an individual resource M to each priority class. As traffic behavior is not predictable, this waste of memory is not practical for practical communication devices, e.g., NPs (network processors) and switches.

From the above it follows that there is still a need in the art for a mechanism that allows sharing of a limited resource, e.g., a memory or buffer, among a set of priorities and still fulfills the requirement to support 100% traffic bursts from any input to any output port without being blocked due to memory or buffer space being consumed by lower priority packets. It is therefore an object of the present invention to provide an improved mechanism for transporting packets of data through a communication system in a loss-less and efficient manner.

SUMMARY OF THE INVENTION

In accordance with the present invention, there is provided a communication device for transporting packets of data, each packet being assigned one of several priorities and received at the communication device based on memory state information. The device comprises a memory for storing the packets and a priority modification unit coupled to the memory for modifying the assigned priority of any of the packets causing congestion within the memory. The modification of the assigned priority of the packets is basically a priority elevation of the packets which cause the congestion in order to resolve blocking problems within the memory.

It is advantageous that the communication device is able to handle bursts without spatial priority blocking. That means the communication device supports packet streams without being blocked due to memory or buffer space being consumed by lower priority packets. Moreover, assuming P priorities or priority classes, the memory size can be reduced to RTT+(P−1). This allows more economic implementations with less memory of a factor close to P.

The priority modification unit can comprise a priority elevation activation unit for starting the modification of the assigned priority of any of the packets causing congestion within the memory. In other words, the priority elevation activation unit grants requests for the priority modification and allows a controlled start of the priority modification.

Further, the priority modification unit can comprise a priority elevation termination unit for stopping the modification of the assigned priority of any of the packets causing congestion within the memory. The priority elevation termination unit allows a controlled termination of the priority modification.

The priority modification unit can comprise a priority scheduler unit for scheduling packets to be transmitted from the memory. This priority scheduler unit normally schedules the packets according to their native priority. In a general view, the packets which cause congestion within the memory are treated by the scheduler unit as packets with a higher than their native priority in order to free the memory from lower priority packets that block higher priority ones. The priority scheduler can be coupled to cross point or output queues belonging to the memory, where a so-called queuing per priority is performed.

In general, the modification of the assigned priority of any of the packets causing congestion can be performed by amending a priority bit in the packet header, removing a packet priority from one output queue and submitting it to another or higher output queue, or amending the priority which is associated with one output queue.

The priority modification unit can comprise a local priority elevation detection unit which in dependence on the status of the memory initiates a priority elevation information for modifying the assigned priority of any of the packets causing congestion within the memory. Using the local priority elevation detection unit allows directly to influence any congestion within the memory in the communication device.

When the communication device comprises a priority elevation mode in which the assigned priority of any of the packets causing congestion within the memory are elevated, then the advantage occurs that a fast and easy switching between the priority elevation mode and the normal operating mode can be performed.

In a second aspect of the present invention, there is provided a communication system comprising a communication device and an input adapter coupled to the communication device. In the communication system, the input adapter comprises a priority elevation detection unit which in dependence on the memory state information and the packets to be transported initiates a priority elevation information for modifying the assigned priority of any of the packets causing congestion within the memory. The input adapter allows therefore to issue remotely the priority elevation information based on the received memory state information and the number of priority packets in the input adapter.

In accordance with a third aspect of the present invention, there is provided the input adapter for transporting packets of data to a communication device. The input adapter comprises a plurality of queue units for buffering the packets to be transported. Each queue unit buffers the packets in accordance with their assigned priority. The input adapter further comprises a memory state information unit for storing memory state information. Moreover, the input adapter comprises a priority elevation detection unit coupled to the memory state information unit and each queue unit for releasing a priority elevation information for modifying the assigned priority of the packets in dependence on the memory state information and the packets to be transported.

In accordance with a fourth aspect of the present invention, there is provided a method for transporting packets of data in a communication device, wherein each packet is assigned one of several priorities and received based on memory state information. The method, also referred to as priority elevation, comprises the steps of storing the received packets in a memory, and modifying the assigned priority of any of the packets causing congestion within the memory.

In general, the method provides a mechanism that allows to use less memory than RTT·P per memory or buffer, in particular a minimum of RTT+(P−1), and still fulfills the requirement to fully support traffic bursts from any input to any output port without being blocked due to memory space being consumed by lower priority packets. This can be achieved in a loss-less manner by temporarily elevating the priority of those lower-priority packets that are blocking memory space or resources required by higher-priority packets as to free up these resources as quickly as possible. This mechanism may cause only slight, easily tolerable, very seldom and short disturbances of the strict priority sequence for the significant gain in memory size.

It is advantageous if the packets which cause congestion within the memory can be detected, because then based on their priorities the priority elevation can be performed and the memory can be released from the packets which cause congestion within the memory.

The step of modifying the assigned priority of the packets can comprise temporarily elevating the assigned priority of any of the packets causing congestion within the memory. This has the advantage that the packets which leave the communication device are further transported with their native priority. In a preferred embodiment the packets which cause congestion are only treated temporarily as if they had a higher priority, but they physically keep their native priority.

It can be advantageous when the modification of the assigned priority of any of the packets causing congestion within the memory is initiated by the communication device which is in the possession of the memory state information. By doing so, the available memory state information can be used directly without being sent to the input adapter. This allows the communication device to act immediately when a congestion within the memory is recognized.

As indicated above, in a preferred embodiment the input adapter can initiate the priority elevation for the packets which cause congestion within the memory. This has the advantage that within the communication system the number of incoming packets at the input adapter and the packets within the memory can be considered and processed. In practice, a priority elevation information can be introduced by the input adapter into one packet to be transported. The packet is then sent from the input adapter to the communication device in which the assigned priority of any of the packets causing congestion within the memory is modified based on the priority elevation information. The priority elevation information, which can be implemented as a bit, can initiate the priority elevation for the priority that the one packet carries. This allows an easy and effective implementation.

BRIEF DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION OF THE INVENTION

In the following the embodiments of the invention are addressed. The number of modules and units is chosen for sake of example only and can be varied without leaving the scope of the invention. For sake of clarity in FIGS. 1 to 3 for a number of identical units arranged in parallel only some of these units are depicted.

Figure 1:
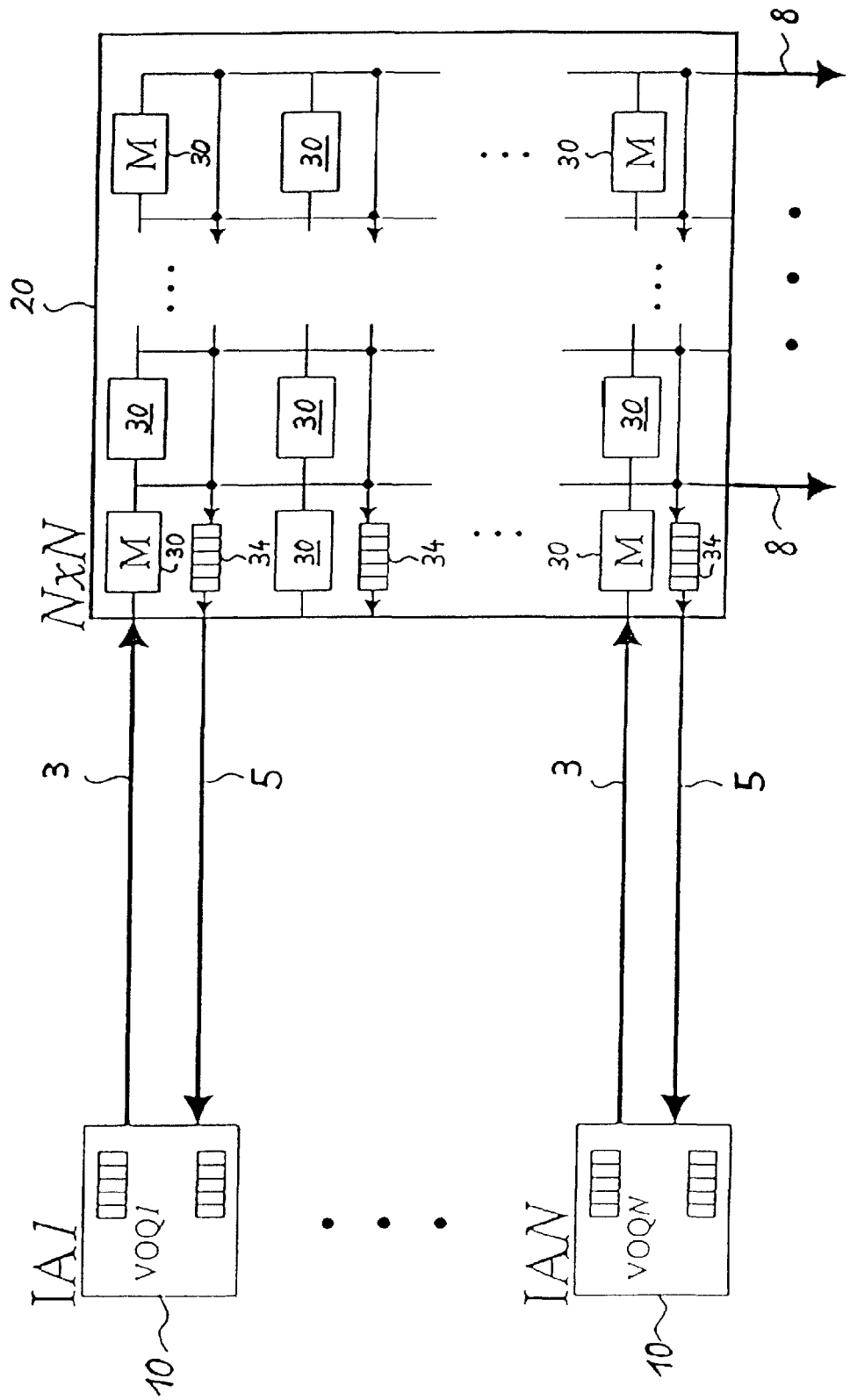
FIG. 1 shows a schematic illustration of a switch arrangement according to the prior art.

Before an embodiment of the present invention is described, a schematic illustration of a switch arrangement of the state of the art is addressed. FIG. 1 shows a communication or switching device 20 that is connected via connecting means 3, 5 to an input adapter 10 and via switching device outputs 8 to output adapters or other communication units, which for the sake of simplicity are not shown. Each input adapter 10 comprises virtual output queues (VOQN), hereafter referred to as queue units. The switching device 20 has a memory 30 that here comprises memory units 30, also labeled with M, which can be shared. These memory units 30 are arranged within a matrix structure, forming rows and columns. The input of each memory unit 30 is connected to its respective input adapter unit 10. The output of each memory unit 30 leads column wise to the respective switching device outputs 8. As the figure is a schematic illustration only, it is understood that in practice the switching device outputs 8 are connected to the respective output adapters, whereby input as well as output adapters can be combined to switch port adapters. Each row of memory units 30 and in particular each memory unit 30 within the row is connected to a FIFO (first-in first-out memory) 34, also referred to as credit-out FIFO 34, for buffering credits. The memory size numbers are equivalent to the number of credits available per input/output pair at initialization. Packets arrive via a data channel of the connecting means 3 after RTT/2, i.e. half round trip time, at the switching device 20 and are stored in the memory unit 30 identified by its destination address. Once the packet has been scheduled for departure and has left the switching device 20, a memory address is freed and stored as a credit in the respective credit-out FIFO 34. It takes another RTT/2 until it arrives at the corresponding VOQ of the respective input adapter unit 10. A credit is the coding of the address of the respective memory unit 30. The shown structure has the disadvantage that priority blocking can not be avoided, that is when blocking of higher priority packets occurs due to switch memory space being consumed by lower priority packets.

The same reference numbers or signs are used to denote the same or like elements.

Figure 2:
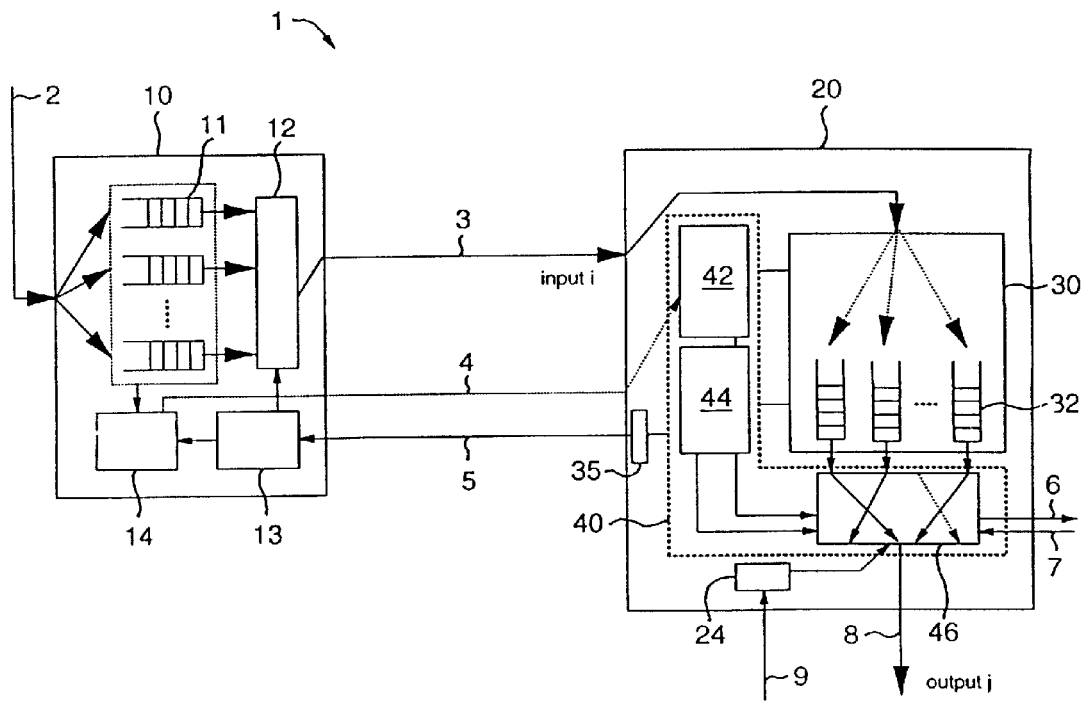
FIG. 2 shows a schematic illustration of a first switch arrangement according to the present invention.

FIG. 2 shows a schematic illustration of a first switch arrangement according to the present invention. The figure shows a communication system 1 comprising an input adapter 10 connected via a first, second, and third connecting means 3, 4, and 5 to a communication device 20, hereafter referred to as switching device 20. Usually, those communication systems are more complex, but for the sake of simplicity only one input adapter 10 and one switching device 20 are depicted. It is assumed that the communication system 1 supports, for example, 8 priorities or priority classes and uses a memory of size b*RTT with b in the order of 2.

The input adapter 10 comprises multiple input queues 11 for buffering the packets to be transported which arrive at an input data channel 2 and are distributed to the respective input queues 11 according to their priorities and destination. The multiple input queues 11 are connected to the priority selector or scheduler 12 which selects the packets to be transported based on memory state information. The input adapter further comprises a memory state information unit 13 coupled to the priority scheduler 12 and a priority elevation detection unit 14 which is connected to the switching device 20 via the second connecting means 4. The priority elevation detection unit 14 which requests a priority elevation gets an input from the multiple queue units 11 and the memory state information unit 13. Within the input adapter 10 the multiple input queues 11 can be implemented (logically) as separate virtual output queues (VOQs) per destination and for each destination P=8 queues per priority. An assumed packet with priority p destined for an output j would hence be enqueued in VOQ(j,p). Associated with each set j of priority queues VOQ(j,0 . . . 7), there is the memory state information unit 13 and the priority elevation detection unit 14 responsible for detecting the need for priority elevation and for requesting it.

Under priority p is understood a particular priority, with p in the range 0 to P−1, whereby P is the number of priorities. Herein, the highest priority is assumed as p=0, also denoted as P0, whilst the lowest priority is P−1, also denoted as P7.

The switching device 20 comprises here a memory 30, which can comprise switch buffers or cross point buffers. The memory 30 further comprises a set of priority buffers with cross point output queues 32, hereafter referred to as output queues 32, which stores the packets currently in the memory 30 according to their priorities. Further, the switching device 20 comprises a priority modification unit 40 which is coupled to the memory 30 and the output queues 32. This priority modification unit 40 comprises a priority elevation activation unit 42 and a priority elevation termination unit 44 which are coupled to each other. The priority modification unit 40 further comprises a priority scheduler unit 46, also referred to as priority remapping unit 46, which receives input from the priority elevation activation unit 42, the priority elevation termination unit 44, and the output queues 32 of the memory 30 and outputs the packets on an output data channel 8, also labeled with output j. The priority scheduler unit 46 can send information via a priority request channel 6 to and receive information via a priority grant channel 7 from an arbiter, also referred to as central arbiter. Furthermore, the switching device 20 comprises here a flow control information unit 24 which receives flow control information via an flow control input channel 9. The flow control information unit 24 is connected to the priority scheduler unit 46 in order to control the decisions of the priority scheduler unit 46. A state information management and transmission unit 35 coupled to the priority modification unit 40 and the memory 30 derives memory state information and sends this information via the third connecting means 5 to the memory state information unit 13 in the input adapter 10. Therefore, the third connecting means 5 is also contemplated as state information channel 5.

The memory state information can be based on grants, rate control, credits or the like, where credits are assumed in the following.

Figure 4:
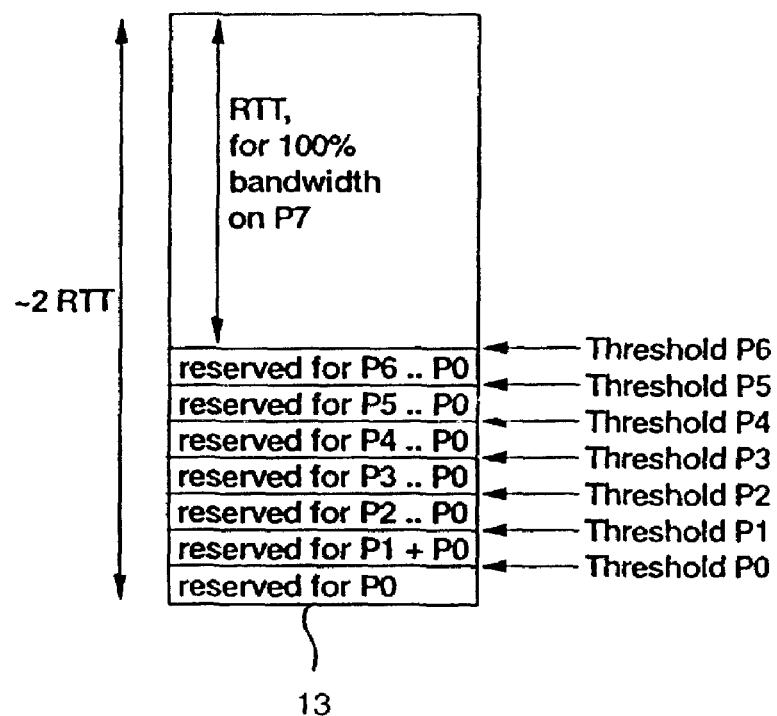
FIG. 4 shows a schematic illustration of the organization of a memory state information unit.

The priority elevation detection unit 14 works such that whenever a packet of priority p consumes a credit out of the memory state information unit 13 and causes a threshold associated with the priority p to be crossed, the packet will be sent via the first connecting means 3 to the switching device 20 with, e.g., a priority elevation bit set to 1 ('true') that is contemplated as priority elevation request, also referred to as priority elevation information. It is also possible to send the priority elevation request separately via the second connecting means 4 (indicated by dotted line) to the priority elevation activation unit 42. Moreover, the first and second connecting means 3, 4 can be implemented as a common channel. FIG. 4 shows a detailed illustration of the organization of such a memory state information unit 13 with a threshold structure.

The priority elevation activation unit 42 checks the arriving packets. Whenever a packet arrives with the priority elevation information, here with the priority elevation bit set to 1 ('true'), the priority elevation mode is entered unconditionally for priority p. Simultaneously, a timer (not shown) associated with the priority elevation mode of priority p is started at the priority elevation termination unit 44. This timer is set to a time-out value T that is determined by RTT minus the difference of thresholds corresponding to priority p and priority p−1, with thresholds as indicated in FIG. 4.

The priority elevation termination unit 44 unit checks the timer, furthermore incoming packets as well as packets leaving the switching device 20. When a packet is transmitted after the time-out, the priority elevation mode is left. When a packet of a lower priority >p arrives at the memory 30 while the priority elevation mode is set, the priority elevation mode is also left and the timer is reset.

The priority scheduling unit 46 realizes the actual priority elevation for all packets with a priority >p during the time the priority elevation mode is set for priority p. The central arbiter for each output data channel 8 can be responsible for scheduling all output queues 32 of each switch buffer of the memory 30 associated with the same output data channel 8. The priority scheduler unit 46 ensures that the actual logical priority queues of the output queues 32, which can be mapped 1:1 to the arbiter, are remapped during the priority elevation mode so that the output queues 32 that are elevated are presented to the arbiter as priority p.

An assumed worst-case situation occurs when a burst of packets of high priority p arrives at the multiple input queues 11 where no credits are available any more because many input queues 11 just previously congested the target switch buffer in the memory 30 completely with traffic of lower priorities >p, furthermore because the memory 30 is smaller than the required minimum of RTT·P, and one considered input queue unit 11 has previously consumed all of its credits with traffic of even lower priorities >>p. In order for the arriving high-priority burst to proceed at 100% throughput in a work-conserving manner, a constant flow of returned credits should be provided immediately. In order to achieve that, the priority elevation detection unit 14 of the input adapter 10 informs the priority modification unit 40 of the switching device 20 about this situation by sending a request, i.e. the priority elevation information, to the switching device 20. Once the switching device 20 has received the request, it has to react by forcing credits to become available somehow and return these to the considered input queue 11 of the input adapter 10. The switching device 20 has also to determine for how long it has to proceed in this mode before it can switch back into normal operation where credits are released again naturally.

Forcing credits to become available could happen immediately by dropping packets which is not acceptable for a loss-less switching device 20. Hence, the presented communication system 1 enforces packets to leave normally by temporarily elevating their priority so that they will be definitely scheduled for being sent to the output data channel 8 within the short term.

Assuming that control and/or state information is carried within packets, the input adapter 10 can request priority elevation from the switching device 20 by sending a packet that requires a credit. For this purpose, in addition to the minimum of RTT credits, there are reserved at least one special credit including its associated space of the memory 30 in the switching device 20 for each priority p except for the lowest priority that can never be blocked by lower priorities. This special credit for priority p may only be taken if there are no normal credits available any more, it can be taken by higher priorities <p and it is not taken by lower priorities >p. In other words, the last remaining P−1 credits at the input adapter 10 are reserved for the P−1 highest priorities.

A packet that is being sent by consuming a special credit is marked in order to indicate to the switching device 20 that priority elevation is requested for the priority p that the packet carries. This request arrives at the target switching device 20 with a delay setting it into the priority elevation mode for priority p. In the priority elevation mode for priority p, all packets with priority >p are being elevated temporarily to priority p.

It is furthermore determined by the priority elevation termination unit 44 for how long priority elevation is useful. Since a minimum buffer space of the memory 30 of RTT should be provided for 100% bandwidth and work-conservingness, conceptually it is useful to free up enough buffer space so that RTT becomes available. A subset of this RTT may already have become free by the time the priority elevation mode is entered. A second subset may naturally become free, namely the buffer space of the memory 30 that is occupied by packets of higher priorities <p. These will have to leave anyhow before it is the turn for priority p according to the normal strict priority rule. Consequently, packets equivalent to RTT minus these two subsets should be elevated at least, unless a lower priority packet arrives earlier from the considered input queue 11, which is the case if the assumed burst was not very long.

Implementation variations of the priority elevation are possible with respect to when the priority elevation mode is activated or terminated. These variations differ by a different tradeoff between implementation complexity and the duration of the slight disturbances of the priority sequences.

Further variations are possible with respect to the size of the memory 30. It becomes clear from the above description, that the minimum is RTT+(P−1). More than that but still significantly less than RTT·P reduces the frequency of priority elevation. In this case, multiple credits could be reserved for each of the P−1 highest priorities in such a way that there still remain RTT credits for all priorities including the lowest one.

Figure 3:
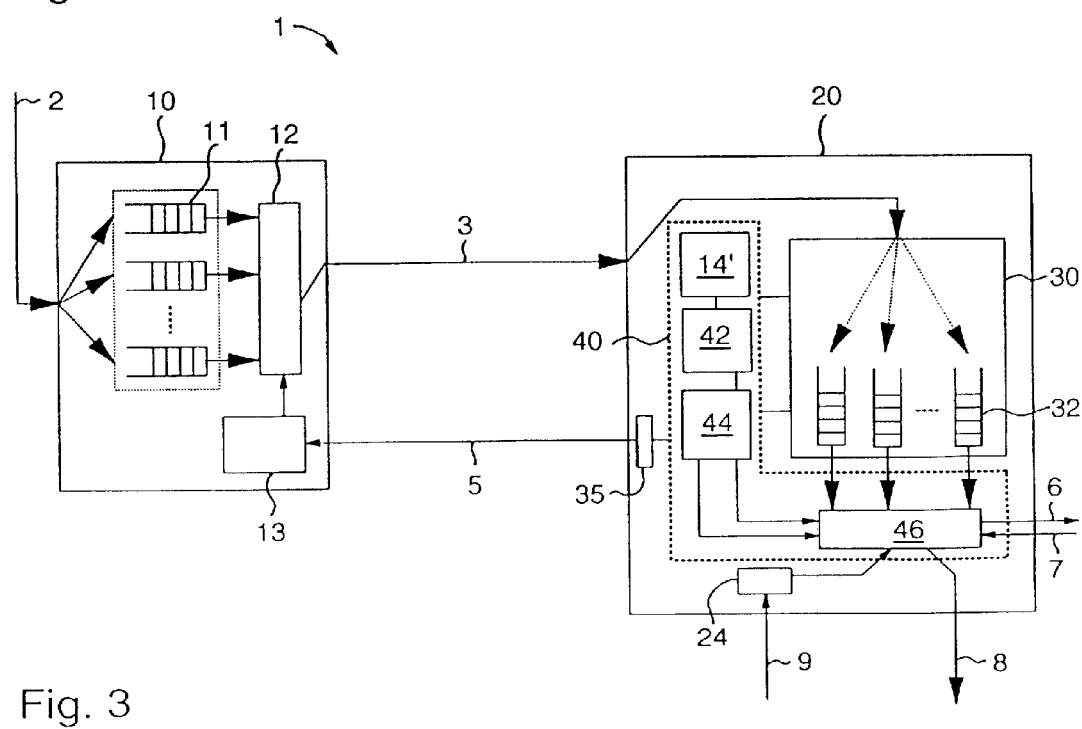
FIG. 3 shows a schematic illustration of a second switch arrangement according to the present invention.

FIG. 3 shows a schematic illustration of a second switch arrangement according to the present invention. This embodiment differs from the embodiment described with reference to FIG. 2 in that the priority modification unit 40 further comprises a local priority elevation detection unit 14'. The functionality of the priority elevation detection unit 14 has moved from the input adapter 10 to the switching device 20.

Therefore, the second connecting means 4 can be avoided in this embodiment. The request for the priority elevation is here initiated by the switching device 20 itself.

FIG. 4 shows a schematic illustration of the organization of the memory state information unit 13, that also can be contemplated as credit bucket 13. The size of the table corresponds to the available associated memory size of b*RTT. It is arranged in 8 sections, i.e. 7 equally sized sections reserved for priority P0, for priority P1 and P0, for P2 to P0, P3 to P0, and so on until P6 . . . P0, whereby here P0 is the highest and P7 the lowest priority. The remaining 8th section of size RTT is available to all priorities and is used for supporting 100% bandwidth even on the lowest priority P7. The credit bucket 13 is assumed to operate as a stack, i.e., the sections are arranged from bottom up with decreasing priority, credits are filled bottom up and credits are consumed from the top. The boundaries between the different sections represent thresholds P0 up to P6 which are relevant for the priority elevation detection unit 14, which also requests the priority elevation. Credits at the top of the credit stack can be consumed by arriving packets if the credit at the top of the stack is in a section that is reserved for priorities equal or higher than the priority of the requesting packet.

Any disclosed embodiment may be combined with one or several of the other embodiments shown and/or described. This is also possible for one or more features of the embodiments.

The invention claimed is:

1. A communication device for transporting packets of data, each packet being assigned one of at least higher and lower priorities and received at the communication device based on memory state information, the device comprising:
   a memory for storing packets, and
   a priority modification unit coupled to the memory for automatically modifying the assigned priority of any of the packets currently causing congestion within a switch buffer of the memory, based on memory state information, in order to resolve spatial priority blocking of higher priority packets within the memory due to switch buffer space being consumed by lower priority packets.

2. A communication device according to claim 1, wherein the priority modification unit comprises a priority elevation activation unit for starting the modification of the assigned priority of any of the packets causing congestion within the memory.

3. A communication device according to claim 2, wherein the priority modification unit further comprises a priority elevation termination unit for stopping the modification of the assigned priority of any of the packets causing congestion within the memory.

4. A communication device according to claim 1, wherein the priority modification unit comprises a priority scheduler unit for scheduling packets to be transmitted from the memory.

5. A communication device according to claim 1, wherein the priority modification unit comprises a local priority elevation detection unit which in dependence on the status of the memory generates priority elevation information for modifying the assigned priority of any of the packets causing congestion within the memory.

6. A communication device according to claim 1, comprising a priority elevation mode in which the assigned priority of any of the packets causing congestion within the memory is being elevated.

7. A communication device as recited in claim 1, further comprising an input adapter coupled to the communication device.

8. A communication device according to claim 7, wherein the input adapter comprises a priority elevation detection unit which in dependence on the memory state information and the packets to be transported generates priority elevation information for modifying the assigned priority of any of the packets causing congestion within the memory.

9. An input adapter for transporting packets of data from a memory to a communication device, each packet being assigned one of at least higher and lower priorities, the adapter comprising:
   a plurality of queue units for buffering the packets to be transported, each queue unit buffering the packets in accordance with their assigned priority;
   a memory state information unit for storing memory state information; and
   a priority elevation detection unit coupled to the memory state information unit and each queue unit for releasing a priority elevation information for automatically modifying the assigned priority of packets currently causing congestion in dependence on the memory state information and the packets to be transported in order to resolve spatial priority blocking of higher priority packets within the memory due to queue unit space being currently consumed by lower priority packets.

10. A method for transporting packets of data in a communication device, wherein each packet is assigned one of at least higher and lower priorities and received based on memory state information, the method comprising the steps of:
   storing the received packets in a memory,
   monitoring the status of the memory based on memory state information; and
   automatically modifying the assigned priority of any of the packets currently causing congestion within the memory, based on the memory state information, in order to resolve spatial priority blocking of higher priority packets within the memory due to lower priority packets.

11. A method according to claim 10, wherein the step of modifying the assigned priority of the packets comprises elevating the assigned priority of any of the packets causing congestion within the memory for a preset period of time.

12. A method according to claim 10, wherein the step of modifying the assigned priority of any of the packets causing congestion within the memory is initiated by the communication device.

13. A method according to claim 10, wherein the step of modifying the assigned priority of any of the packets causing congestion within the memory is initiated by an input adapter coupled to the communication device.

14. A method according to claim 13, wherein a priority elevation information is introduced by the input adapter into one packet to be transported, said packet being sent from the input adapter to the communication device in which the assigned priority of any of the packets causing congestion within the memory is modified based on the priority elevation information.

15. A communication device for transporting packets of data, each packet being assigned one of at least higher and lower priorities, the device comprising:
   a memory for storing the packets; and
   a priority modification unit coupled to the memory for automatically modifying the assigned priority of any of the packets currently causing congestion within the memory, based on memory state information, in order to resolve spatial priority blocking of higher priority packets within the memory by lower priority packets.

16. A non-transitory program storage device readable by a digital processing apparatus and having a program of instruction which are tangibly embodied on the storage device and which are executable by the processing apparatus to perform a method for transporting packets of data in a communication device, wherein each packet is assigned one of at least higher and lower priorities and received based on memory state information, the method comprising the steps of:

storing the received packets in a memory, monitoring the status of the memory based on memory state information; and automatically modifying the assigned priority of any of the packets currently causing congestion within the memory in order to resolve spatial priority blocking of higher priority packets within the memory due to lower priority packets.

* * * * *